US012756825B2

(12) United States Patent
Lai et al.

(10) Patent No.: US 12,756,825 B2
(45) Date of Patent: *Oct. 6, 2026

(54) ENCODING AND DECODING METHODS AND APPARATUSES WITH MULTIPLE IMAGE BLOCK DIVISION MANNERS

(71) Applicants: HUAWEI TECHNOLOGIES CO., LTD., Shenzhen (CN); TSINGHUA UNIVERSITY, Beijing (CN)

(72) Inventors: Changcai Lai, Shenzhen (CN); Xiaoran Cao, Beijing (CN); Yongbing Lin, Beijing (CN); Lingzhi Liu, Shenzhen (CN); Yun He, Beijing (CN)

(73) Assignees: Huawei Technologies Co., Ltd., Shenzhen (CN); Tsinghua University, Beijing (CN)

( * ) Notice: Subject to any disclaimer, the term of this patent is extended or adjusted under 35 U.S.C. 154(b) by 0 days.

This patent is subject to a terminal disclaimer.

(21) Appl. No.: 18/911,929

(22) Filed: Oct. 10, 2024

(65) Prior Publication Data

US 2025/0039373 A1 Jan. 30, 2025

Related U.S. Application Data

(63) Continuation of application No. 18/356,955, filed on Jul. 21, 2023, now Pat. No. 12,143,582, which is a (Continued)

(30) Foreign Application Priority Data

Jan. 14, 2011 (CN) ........................ 201110007657.7

(51) Int. Cl.
*H04N 19/119* (2014.01)
*H04N 19/124* (2014.01)
(Continued)

(52) U.S. Cl.
CPC ......... *H04N 19/119* (2014.11); *H04N 19/124* (2014.11); *H04N 19/147* (2014.11);
(Continued)

(58) Field of Classification Search
CPC .. H04N 19/119; H04N 19/124; H04N 19/147; H04N 19/172; H04N 19/46; H04N 19/61
See application file for complete search history.

(56) References Cited

U.S. PATENT DOCUMENTS 9,386,324 B2 7/2016 Kim et al.
10,869,035 B2 12/2020 Lai et al.
(Continued)

FOREIGN PATENT DOCUMENTS

CN 101415121 A 4/2009
CN 101938657 A 1/2011
(Continued)

OTHER PUBLICATIONS

Cao et al, Joint Collaborative Team on Video Coding (JCT-Ð¡) of ITU-T SG16 WP3 and ISO/IEC JTC1/SC29/WG11, Mar. 16-23, 2011 (Year: 2011).*
(Continued)

*Primary Examiner* — Farzana Hossain
(74) *Attorney, Agent, or Firm* — Leydig, Voit & Mayer, Ltd.

(57) ABSTRACT

An encoding method with multiple image block division manners is disclosed, including: receiving a bitstream; parsing the bitstream to determine that a current image block is required to be partitioned; in response to determine that the current image block is required to be partitioned, parsing the bitstream to determine a partition direction, wherein the partition direction is a horizontal direction; partitioning the current image block into four rectangular subblocks when the partition direction is the horizontal direction, wherein a
(Continued)

size of the current image block is expressed as 4×16, and a size of each of the four rectangular subblocks is expressed as 1×16; and reconstructing the current image block based on the four rectangular subblocks.

3 Claims, 8 Drawing Sheets

Related U.S. Application Data continuation of application No. 17/673,512, filed on Feb. 16, 2022, now Pat. No. 11,750,809, which is a continuation of application No. 17/094,560, filed on Nov. 10, 2020, now Pat. No. 11,290,717, which is a continuation of application No. 13/938,992, filed on Jul. 10, 2013, now Pat. No. 10,869,035, which is a continuation of application No. PCT/CN2011/082003, filed on Nov. 9, 2011.

(51) Int. Cl.
*H04N 19/147* (2014.01)
*H04N 19/172* (2014.01)
*H04N 19/46* (2014.01)
*H04N 19/61* (2014.01)

(52) U.S. Cl.
CPC .......... *H04N 19/172* (2014.11); *H04N 19/46* (2014.11); *H04N 19/61* (2014.11)

(56) References Cited

U.S. PATENT DOCUMENTS

| | | | | |
|---|---|---|---|---|
| 11,290,717 | B2 | 3/2022 | Lai et al. | |
| 2004/0081238 | A1 | 4/2004 | Parhy | |
| 2005/0201462 | A1 | 9/2005 | Ridge et al. | |
| 2005/0249291 | A1 | 11/2005 | Gordon et al. | |
| 2006/0164268 | A1* | 7/2006 | Lee | H04N 19/149 375/E7.157 |
| 2006/0164560 | A1 | 7/2006 | Watanabe | |
| 2008/0101707 | A1 | 5/2008 | Mukherjee et al. | |
| 2008/0152000 | A1* | 6/2008 | Kaushik | H04N 19/103 375/240.03 |
| 2009/0067508 | A1* | 3/2009 | Walls | H04N 19/176 375/E7.076 |
| 2009/0109341 | A1* | 4/2009 | Oguz | H04N 5/147 348/625 |
| 2009/0232211 | A1 | 9/2009 | Chen et al. | |
| 2010/0195715 | A1 | 8/2010 | Liu et al. | |
| 2011/0135000 | A1 | 6/2011 | Alshina et al. | |
| 2011/0158315 | A1 | 6/2011 | Kim et al. | |
| 2013/0287116 | A1 | 10/2013 | Helle et al. | |
| 2016/0227234 | A1 | 8/2016 | Han et al. | |

FOREIGN PATENT DOCUMENTS

| | | | |
|---|---|---|---|
| WO | 2010027170 | A2 | 3/2010 |
| WO | 2010039733 | A2 | 4/2010 |
| WO | 2010039822 | A2 | 4/2010 |
| WO | 2010151018 | A2 | 12/2010 |

OTHER PUBLICATIONS

U.S. Appl. No. 18/356,955, filed Jul. 21, 2023.
U.S. Appl. No. 17/673,512, filed Feb. 16, 2022.
U.S. Appl. No. 17/094,560, filed Nov. 10, 2020.
U.S. Appl. No. 13/938,992, filed Jul. 10, 2013.
Lim et al., "Description of video coding technology proposal," 92th Moving Pictures Expert Group Meeting & 1st Joint Collaborative Team on Video Coding Meeting, JCTVC-A113, Dresden, Germany, pp. 1-18 (Apr. 15-23, 2010).
Wien et al., "Hybrid Video Coding using Variable Size Block Transforms," Visual Communications and Image Processing 2002, Proceedings of SPIE, vol. 4671, pp. 1040-1051 (2002).
Lee et al., "A Hierarchical Variable-Sized Block Transform Coding Scheme for Coding Efficiency Improvement on H.264/AVC," 28th Picture Coding Symposium, PCS2010, Nagoya, Japan, pp. 522-525, Institute of Electrical and Electronics Engineers, New York, New York (Dec. 8-10, 2010).
Mccann et al., "Samsung's Response to the Call for Proposals on Video Compression Technology," Joint Collaborative Team on Video Coding (JCT-VC) of ITU-T SG16 WP3 and ISO/IEC JTC1/SC29/WG11, JCTVC-A124, Dresden, Germany, pp. 1-42 (Apr. 15-23, 2010).
"Series H: Audiovisual and Multimedia Systems; Infrastructure of Audiovisual Services—Coding of Moving Video," ITU-T, Geneva, Switzerland (Mar. 2009).
Sohn et al., "One Dimensional Transform for H.264 Based Intra Coding," IEEE, New York, New York (2009).
U.S. Appl. No. 61/391,473, Helle., filed Oct. 8, 2010.
"Line Transmission of Non-Telephone Signals, Video Codec for Audiovisual Services at p x 64 kbits," ITU-T H.261 (Mar. 1993), total 29 pages, International Telecommunication Union, Geneva, Switzerland (Mar. 1993).
"Series H: Audiovisual and Multimedia Systems, Infrastructure of audiovisual services—Coding of moving video, Advanced video coding for generic audiovisual services," ITU-T H.264 (Mar. 2010), total 676 pages, International Telecommunication Union, Geneva, Switzerland (Mar. 2010).
International Search Report in corresponding International Patent Application No. PCT/CN2011/082003 (Feb. 16, 2012).
Written Opinion of the International Searching Authority in corresponding International Patent Application No. PCT/CN2011/082003 (Feb. 16, 2012).
Cao et al. "CE6.b Report on Short Distance Intra Prediction Method," Joint Collaborative Team on Video Coding (JCT-VC) of ITU-T SG16 WP3 and ISO/IEC JTC1/SC29/WG11 (Jan. 20-28, 2011).
Cao et al. "CE6.b Report on Short Distance Intra Prediction Method," Document JCTVC-D299 (Created Jan. 15, 2011; First Upload Jan. 15, 2011) (available at: https://mpeg.expert/jct/meetings/meeting_143.html).

* cited by examiner

ENCODING AND DECODING METHODS AND APPARATUSES WITH MULTIPLE IMAGE BLOCK DIVISION MANNERS

CROSS-REFERENCE TO RELATED APPLICATIONS

This application is a continuation of U.S. patent application Ser. No. 18/356,955, filed on Jul. 21, 2023, which is a continuation of U.S. patent application Ser. No. 17/673,512, filed on Feb. 16, 2022 (now U.S. Pat. No. 11,750,809), which is a continuation of U.S. patent application Ser. No. 17/094,560, filed on Nov. 10, 2020 (now U.S. Pat. No. 11,290,717), which is a continuation of U.S. patent application Ser. No. 13/938,992, filed on Jul. 10, 2013 (now U.S. Pat. No. 10,869,035), which is a continuation of International Patent Application No. PCT/CN2011/082003, filed on Nov. 9, 2011. The International Patent Application claims priority to Chinese Patent Application No. 201110007657.7, filed on Jan. 14, 2011. All of the afore-mentioned patent applications are hereby incorporated by reference in their entireties.

TECHNICAL FIELD

The present disclosure relates to video encoding and decoding technologies, and in particular, to encoding and decoding methods and apparatuses with multiple image block division manners.

BACKGROUND

The basic principle of video encoding and compression is to eliminate redundancy as far as possible by using correlation between space domain, time domain and a codeword. Currently, a popular practice is to implement video encoding and compression by performing steps such as prediction, transformation, quantization, and entropy encoding in a block-based hybrid video encoding framework. Such a block-based hybrid video encoding framework takes on exuberant vitality, and its application ranges from the earliest MPEG-1 to the latest video encoding standard H.264/AVC and even will encompass the next-generation video encoding and compression standard HEVC under development by the JCTVC workgroup (a workgroup jointly founded by MPEG and VECG).

Generally, video encoding and decoding is implemented by using a block-based space domain prediction encoding technology, and the basic principle is to eliminate space domain redundancy based on correlation between adjacent blocks, that is, predict the current block by using its adjacent block as a reference block. In the prior art, to improve accuracy of pixel prediction, a current image block is generally divided into four identical square image subblocks, and then prediction is performed by using each subblock as a unit and based on a pixel value of an adjacent block of the current image block. In some occasions, in order to further improve the prediction accuracy, one of the four image subblocks is subdivided into four smaller square image subblocks. For example, a 64×64 current image block may be divided into four 32×32 image subblocks; and a 32×32 image subblock may be divided into four 16×16 image subblocks.

Obviously, the image block division and prediction mode in the prior art is merely to divide an image block into four square image subblocks and predict the image subblock simply according to the adjacent block of the current image block. This manner lacks flexibility and hardly attains high prediction accuracy and good encoding and decoding effects.

SUMMARY

An embodiment of the present disclosure provides an encoding method with multiple image block division manners, including: determining a division manner of an encoding object in a current frame, where the division manner of the encoding object in the current frame includes square division and non-square division; determining, if the division manner of the encoding object in the current frame is non-square division, a division direction of the encoding object in the current frame, where the division direction includes horizontal division and vertical division; dividing the encoding object in the current frame according to the division manner and the division direction, to obtain image subblocks sequentially arranged horizontally or vertically; determining whether the image subblocks need subdivision, and if subdivision is not needed, predicting the encoding object in the frame according to the image subblocks, to obtain residual data; performing transformation, quantization, and entropy encoding for the residual data so as to obtain coded residual data; and writing into a bitstream the division manner of the encoding object in the current frame, the division direction of the encoding object in the current frame, an identifier indicating whether the image subblocks need subdivision, and the coded residual data, or, when the image subblocks are not further divisible into image subblocks of a preset size, writing an identifier of the division direction, an identifier of the division manner, and the coded residual data into a bitstream.

Further, another embodiment of the present disclosure provides an encoding method with multiple image block division manners, including: dividing an encoding object in a current frame by traversal and performing prediction encoding respectively; and among prediction encoding results, selecting the following information corresponding to a division process with a minimal code rate distortion cost: a division manner, a division direction, and whether image subblock needs subdivision, where the division manner includes square division and non-square division, and the division direction includes horizontal division and vertical division; dividing, according to the division direction if the division manner is non-square division, the encoding object in the current frame into image subblocks sequentially arranged horizontally or vertically; determining whether the image subblocks need subdivision, and if determining that the image subblocks need no subdivision, predicting the encoding object in the frame according to the image subblocks, to obtain residual data; performing transformation, quantization, and entropy encoding for the residual data so as to obtain coded residual data; and writing into a bitstream the division manner, the division direction, an identifier indicating whether the image subblocks need subdivision, and the coded residual data, or, when the image subblocks are not further divisible into image subblocks of a preset size, writing an identifier of the division manner, an identifier of the division direction, and the coded residual data into a bitstream.

Further, an embodiment of the present disclosure provides a corresponding decoding method with multiple image block division manners, including: parsing a bitstream to obtain a division manner and a division direction of a decoding object in a current frame, an identifier indicating whether image subblocks of the decoding object in the current frame need subdivision, and residual data of the decoding object in the current frame, where the division manner includes square division and non-square division, and the division direction includes vertical division and horizontal division; dividing the decoding object in the current frame according to the division manner and the division direction, to obtain image subblocks sequentially arranged horizontally or vertically; determining whether to subdivide the image subblocks according to the identifier indicating whether the image subblocks of the decoding object in the current frame need subdivision in the bitstream; and decoding the image subblocks according to the residual data if the identifier indicating whether the image subblocks of the decoding object in the current frame need subdivision indicates that the image subblocks need no subdivision, or if the image subblocks are not further divisible into image subblocks of a preset size.

Further, correspondingly, embodiments of the present disclosure provide an encoding apparatus and a decoding apparatus that apply the foregoing encoding method and decoding method.

Further, an embodiment of the present disclosure provides another decoding method for an intra-frame block in image decoding, including: obtaining a division manner of a decoding object in a current frame, a prediction mode of a prediction block under the division manner, and residual data of the decoding object; obtaining an identifier indicating whether to subdivide a transformation block of the prediction block, and obtaining a size of the transformation block of the prediction block according to the identifier and a division manner of the prediction block; using a transformation matrix of the size to transform the residual data and obtain transformed residual data; using the prediction mode to obtain infra-frame prediction data of the prediction block; and using the prediction data and the residual data to decode the intra-frame block.

In the decoding method provided in the embodiment, the encoding object in the frame is divided into image subblocks sequentially arranged horizontally or vertically; when the image subblocks need subdivision, the image subblocks may be divided into multiple square blocks of a predefined size, or multiple rectangular blocks whose width is unequal to height or length; when the width is greater than the height, the image subblocks are divided horizontally; when the width is less than the height, the image subblocks are divided vertically.

According to the encoding method and the decoding method provided in the embodiments of the present disclosure, during image block division, an image block is divided into rectangular image subblocks horizontally or vertically, so that better prediction accuracy can be achieved when the image block presents a small change of pixel value in the horizontal or vertical direction.

DESCRIPTION OF EMBODIMENTS

Figure 1:
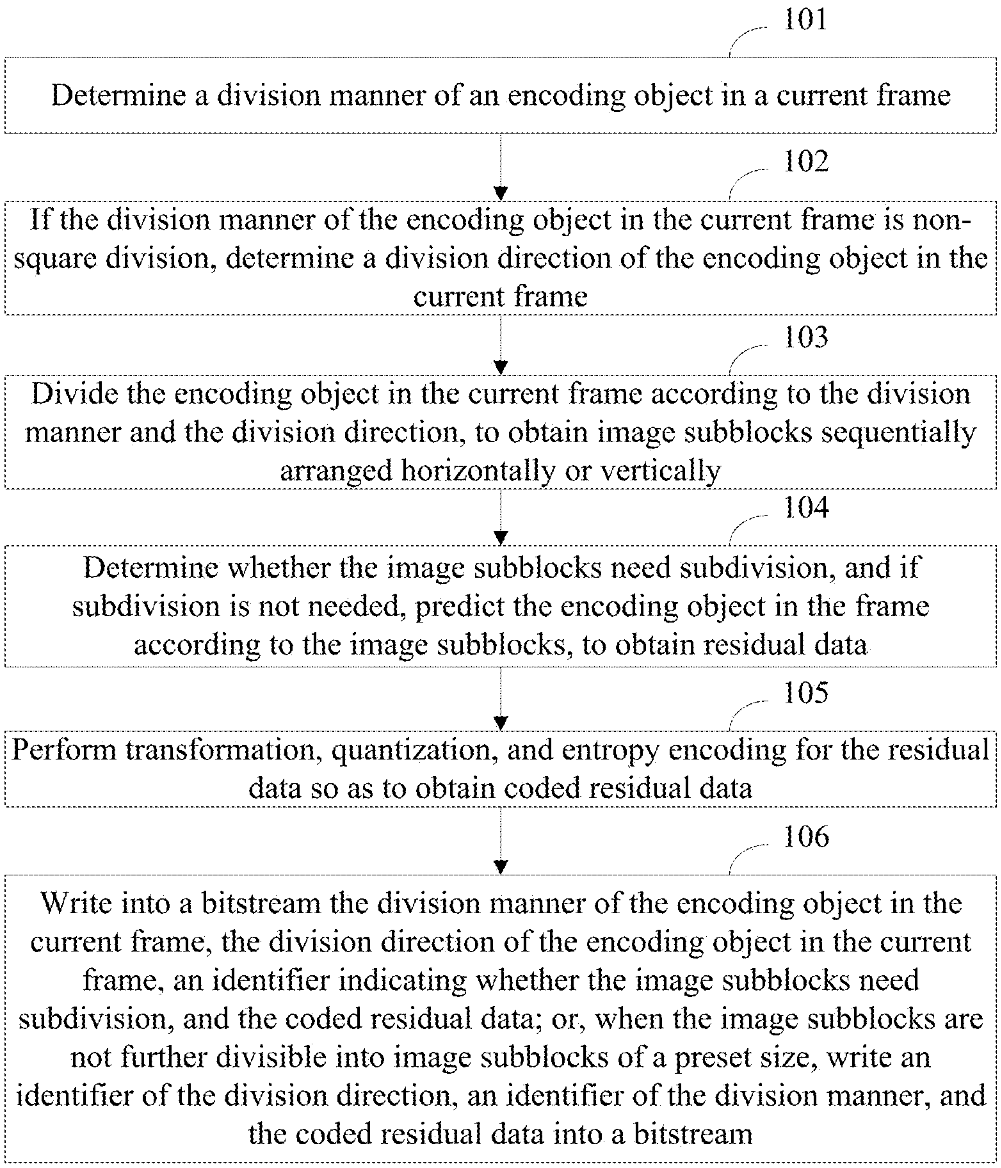
FIG. 1 is a schematic diagram of an encoding method with multiple image block division manners according to an embodiment of the present disclosure.

Referring to FIG. 1, an embodiment of the present disclosure provides an encoding method with multiple image block division manners, including the following steps:

Step 101: Determine a division manner of an encoding object in a current frame.

In the embodiment of the present disclosure, the division manner of the encoding object in the current frame includes square division and non-square division.

In the embodiment of the present disclosure, the square division refers to dividing the encoding object in the current frame into four square image subblocks of the same size.

The non-square division refers to dividing the encoding object in the current frame into vertically or horizontally arranged image subblocks of the same shape. Evidently, in the embodiment of the present disclosure, rectangular image subblocks are preferred. For example, an N×N image block is divided into several M×N or N×M image subblocks, where M and N are positive integers greater than 1, N is an integer multiple of M, and in the embodiment of the present disclosure, N is four times greater than M. Even the N×N image block is divided into several 1×N or N×1 linear image subblocks. Nevertheless, persons skilled in the art may consider dividing the encoding object in the current frame into image subblocks of other shapes that may be "sequentially arranged".

In the embodiment of the present disclosure, the encoding object in the current frame may be a 32×32 image block, or an image subblock of a 32×32 image block, or an image subblock of a smaller image block.

Step 102: If the division manner of the encoding object in the current frame is non-square division, determine a division direction of the encoding object in the current frame.

Figure 2:
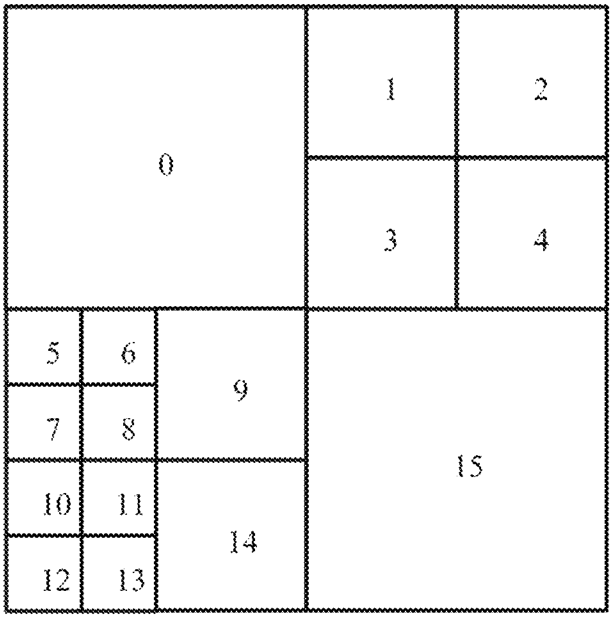
FIG. 2 is a schematic diagram of square division.

Specifically, referring to FIG. 2 first, FIG. 2 is a schematic diagram of square division, which refers to dividing the encoding object in the current frame into four square image subblocks according to the division method in the prior art. The image subblocks that derive from the square division are squares of an equal size, respectively located at four corners of the encoding object in the current frame. It can be seen that, the image block shown in FIG. 2 is divided into four square image subblocks, and the image subblock in its upper right corner is further divided into secondary square image subblocks 1, 2, 3, and 4.

Figure 3:
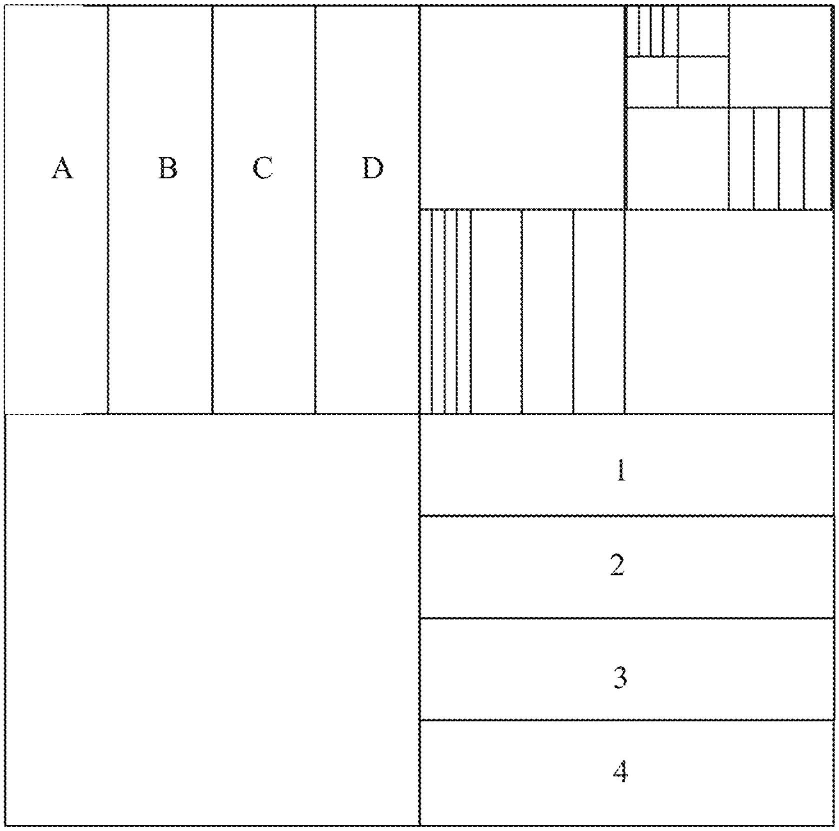
FIG. 3 is a schematic diagram of non-square division.

In the embodiment of the present disclosure, non-square division further includes horizontal division and vertical division from the perspective of division direction. Referring to FIG. 3, FIG. 3 is a schematic diagram of the non-square division described in the embodiment of the present disclosure. In the embodiment of the present disclosure, the non-square division includes vertical division and horizontal division. The image subblock in the lower right corner of the image block shown in FIG. 3 is horizontally divided into image subblocks 1, 2, 3, and 4. In the embodiment of the present disclosure, horizontal division refers to dividing the encoding object in the current frame into multiple image subblocks of the same shape arranged vertically. The upper left block of the image block shown in FIG. 3 is vertically divided into four image subblocks A, B, C, and D. In the embodiment of the present disclosure, vertical division refers to dividing the current image block into multiple image subblocks of the same shape arranged horizontally.

Step 103: Divide the encoding object in the current frame according to the division manner and the division direction, to obtain image subblocks sequentially arranged horizontally or vertically.

Step 104: Determine whether the image subblocks need subdivision, and if subdivision is not needed, predict the encoding object in the frame according to the image subblocks, to obtain residual data; otherwise, subdivide the image subblocks according to the predefined size. As shown in FIG. 3, a 4×16 image block is subdivided into four 1×16 blocks.

Step 105: Perform transformation, quantization, and entropy encoding for the residual data so as to obtain coded residual data.

Step 106: Write into a bitstream the division manner of the encoding object in the current frame, the division direction of the encoding object in the current frame, an identifier indicating whether the image subblocks need subdivision, and the coded residual data; or, when the image subblocks are not further divisible into image subblocks of a preset size, write an identifier of the division direction, an identifier of the division manner, and the coded residual data into a bitstream.

In the embodiment of the present disclosure, the writing into a bitstream the division manner, the division direction, and an identifier indicating whether the image subblocks need subdivision, includes:

- writing into a bitstream the identifier of the division manner, the identifier of the division direction, and the identifier indicating whether the image subblocks need subdivision.

Alternatively, in other optional embodiments, the writing into a bitstream the division manner, the division direction, and an identifier indicating whether the image subblocks need subdivision may include:

- searching a corresponding combination list to obtain a corresponding index value according to the division manner, the division direction, and whether the image subblocks need subdivision; and
- writing the index value into the bitstream.

Alternatively, the writing into a bitstream the division manner, the division direction, and an identifier indicating whether the image subblocks need subdivision may include:

- searching a corresponding combination list to obtain a corresponding index value according to the division manner and the division direction; and
- writing the index value and the identifier indicating whether the image subblocks need subdivision into the bitstream.

In an optional embodiment, the writing an identifier of the division direction, an identifier of the division manner, and the coded residual data into a bitstream may include:

- writing the identifier of the division manner and the identifier of the division direction into the bitstream; or
- searching a corresponding combination list to obtain a corresponding index value according to the division manner and the division direction, and writing the index value into the bitstream.

In the embodiment of the present disclosure, the identifier indicating whether the image subblocks need subdivision may be a bit such as 0 or 1 for indicating whether all the image subblocks need subdivision. The identifier indicating whether the image subblocks need subdivision may also be multiple bits that are respectively used for indicating whether respective image subblocks need subdivision. Alternatively, the identifier indicating whether the image subblocks need subdivision may also be an index value that corresponds to a combination of information indicating whether each of the image subblocks needs subdivision. Evidently, if it is determined that the image subblocks need subdivision, the subdivision is only a process of repeating steps 101, 102, and 103 for the image subblocks by taking the image subblocks as encoding objects in the current frame, until the image subblocks need no subdivision. The process is cyclic, for example:

The determining whether the image subblocks need subdivision includes:

- dividing an image subblock into secondary image subblocks of different sizes according to preset image subblock sizes, and determining that the image subblocks need no subdivision if a code rate distortion cost sum of encoding all secondary image subblocks of the multiple sizes is greater than a code rate distortion cost of directly encoding the image subblocks that are no longer subdivided; and
- determining whether the image subblocks are further divisible into image subblocks of a preset size; and if not divisible, determining that the image subblocks need no subdivision, where, in practical application, both an encoder and a decoder may have preset image block sizes, and an image block is divisible only if the image block is divisible into such sizes or only if the size of the image block is greater than the preset sizes; when image subblocks need no division for this reason, the encoder may choose not to write the identifier indicating whether the image subblocks need subdivision into the bitstream.

Figure 4:
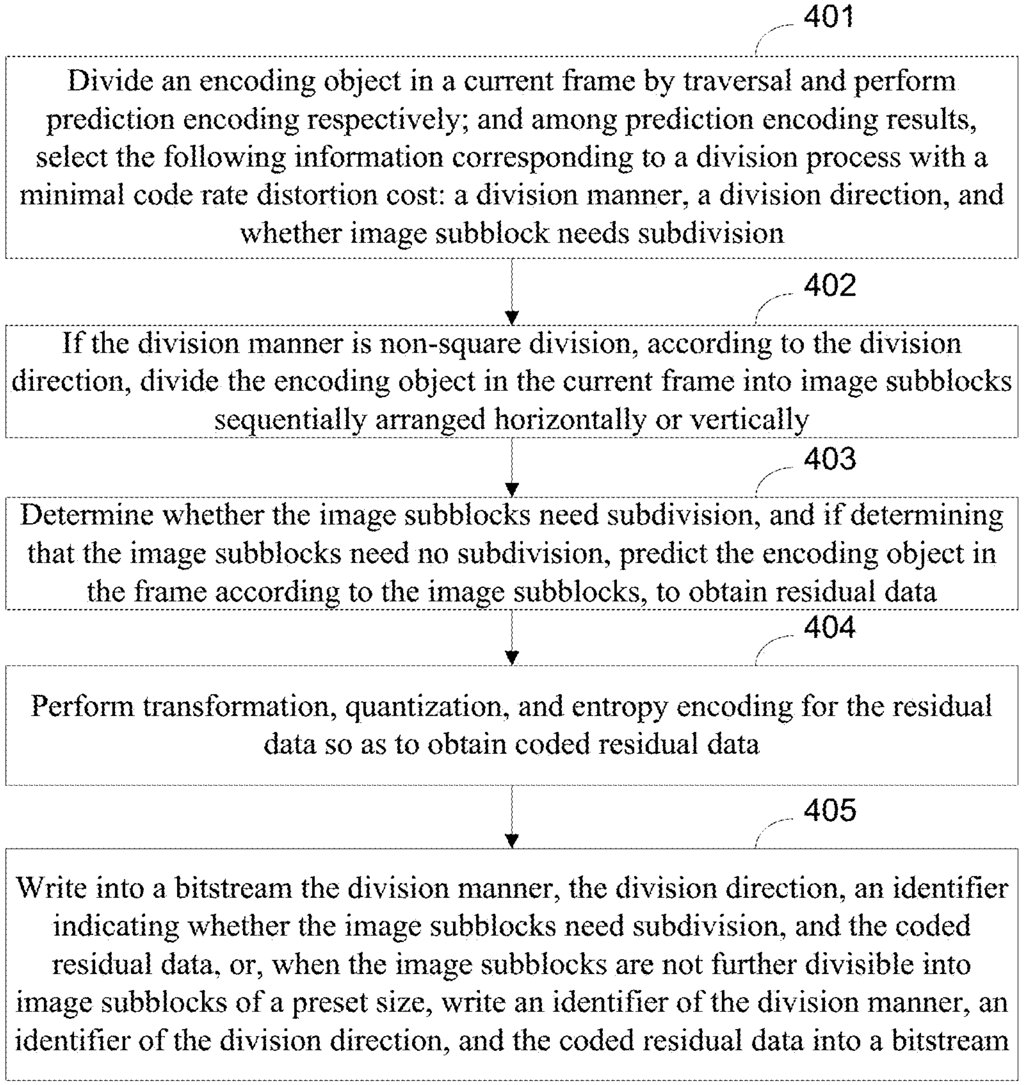
FIG. 4 is a schematic diagram of an encoding method with multiple image block division manners according to another embodiment of the present disclosure.

In the embodiment of the present disclosure, the division manner and the division direction of the encoding object in the current frame, and whether the image subblocks need subdivision may be determined in a conventional manner of traversal or partial traversal. The traversal or partial traversal refers to attempting all or some possibilities of the division manner, the division direction, and whether the image subblocks need subdivision; or, presetting some probable combinations according to characteristics of the current encoding object, traversing the combinations, performing pixel prediction, and selecting a combination that brings the optimal encoding performance of encoding the current encoding object, and then encoding the encoding object in the current frame according to the division manner, the division direction, and whether the image subblock need subdivision in the optimal combination. Traversal is a common determining method for the prediction direction and the image block division in the video encoding and decoding field. The traversal simply makes attempts and selects the optimal results of the attempts, and is not detailed here any further. However, correspondingly, from another perspective, referring to FIG. 4, an encoding method with multiple image block division manners according to another embodiment of the present disclosure may include the following steps:

Step 401: Divide an encoding object in a current frame by traversal and perform prediction encoding respectively; and among prediction encoding results, select the following information corresponding to a division process with a minimal code rate distortion cost: a division manner, a division direction, and whether image subblock needs subdivision.

The division manner includes square division and non-square division, and the division direction includes horizontal division and vertical division.

Step 402: If the division manner is non-square division, according to the division direction, divide the encoding object in the current frame into image subblocks sequentially arranged horizontally or vertically; if the division direction is horizontal division, divide the encoding object in the current frame into multiple image subblocks of the same shape arranged vertically; if the division direction is vertical division, divide the encoding object in the current frame into multiple image subblocks of the same shape arranged horizontally.

Step 403: Determine whether the image subblocks need subdivision, and if determining that the image subblocks need no subdivision, predict the encoding object in the frame according to the image subblocks, to obtain residual data.

Step 404: Perform transformation, quantization, and entropy encoding for the residual data so as to obtain coded residual data.

Step 405: Write into a bitstream the division manner, the division direction, an identifier indicating whether the image subblocks need subdivision, and the coded residual data, or, when the image subblocks are not further divisible into image subblocks of a preset size, write an identifier of the division manner, an identifier of the division direction, and the coded residual data into a bitstream.

If the bitstream does not include an identifier indicating whether the image subblocks need subdivision, it indicates that the corresponding image subblocks are not further divisible into image subblocks of the preset size.

Certainly, persons of ordinary skill in the art should understand that when the encoder performs traversal or prediction for the image subblocks, the encoder needs to record the prediction direction of each image subblock, determine a reference image block of the image subblock, perform prediction according to the prediction direction and the pixel value of the reference image block, and finally, write the prediction direction into the bitstream so that the decoder can perform the same prediction process. Such processes involve detailed pixel prediction methods, and can be performed solely according to the prior art. They are not related to the subject matter of the present disclosure, and are not detailed here any further.

To sum up, in the encoding method with multiple image block division manners according to the embodiment of the present disclosure, during image block division, an image block is divided into rectangular image subblocks arranged horizontally or vertically, so that when the image block presents a small change of pixel value in the horizontal or vertical direction, better prediction accuracy can be achieved compared with the division manner in the prior art which simply divides the image block into square image subblocks at four corners.

Figure 5:
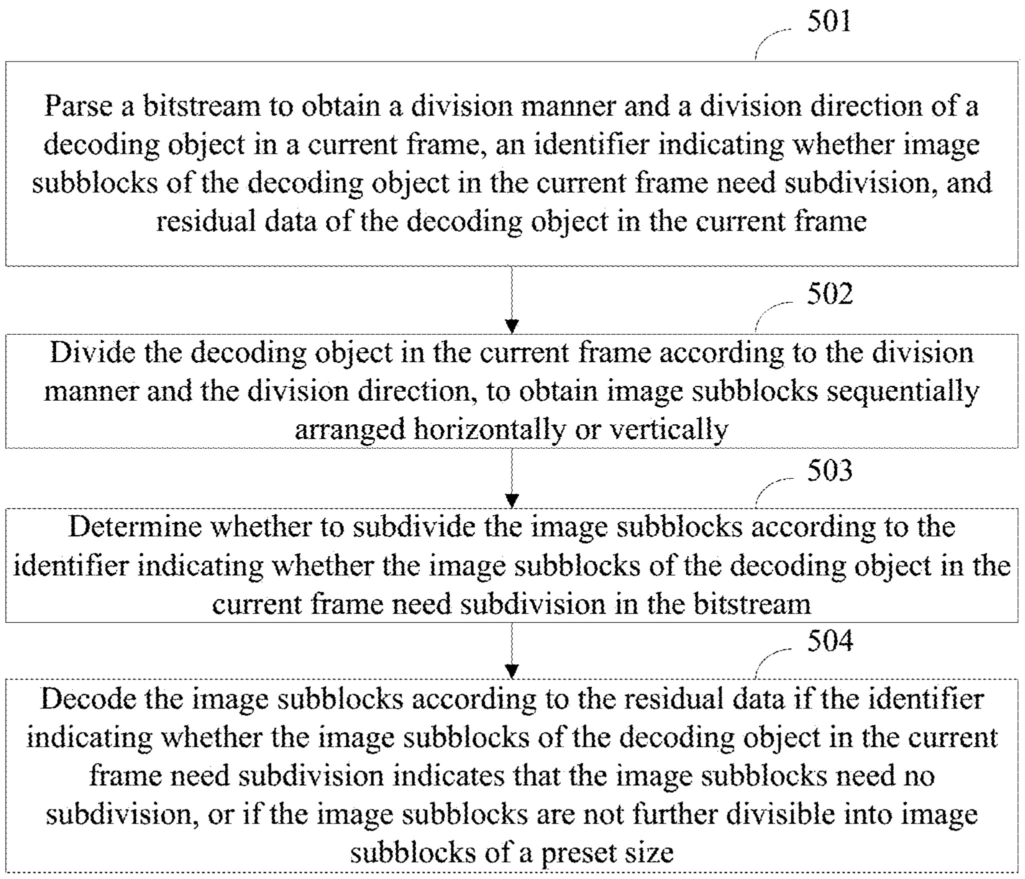
FIG. 5 is a schematic diagram of a decoding method with multiple image block division manners according to an embodiment of the present disclosure.

Further, an embodiment of the present disclosure provides a corresponding decoding method. Referring to FIG. 5, the decoding method with multiple image block division manners according to the embodiment of the present disclosure includes the following steps:

Step 501: Parse a bitstream to obtain a division manner and a division direction of a decoding object in a current frame, an identifier indicating whether image subblocks of the decoding object in the current frame need subdivision, and residual data of the decoding object in the current frame.

The division manner includes square division and non-square division, and the division direction includes vertical division and horizontal division.

In the embodiment of the present disclosure, the square division refers to dividing the decoding object in the current frame into four square image subblocks of the same size.

The non-square division refers to dividing the decoding object in the current frame into vertically or horizontally arranged image subblocks of the same shape. Evidently, in the embodiment of the present disclosure, rectangular image subblocks are preferred. Nevertheless, persons skilled in the art may consider dividing the decoding object in the current frame into image subblocks of other shapes that may be "arranged sequentially".

Besides, understandably, if the bitstream does not include an identifier indicating whether the image subblocks of the decoding object in the current frame need subdivision, it may be construed as no need of subdividing the corresponding image subblocks, or construed as the corresponding image subblocks being not divisible into image subblocks of a preset size. In this case, it is not necessary to obtain the identifier indicating whether the image subblocks of the decoding object in the current frame need subdivision.

In the embodiment of the present disclosure, the parsing a bitstream to obtain a division manner and a division direction of a decoding object in a current frame, and an identifier indicating whether image subblocks of the decoding object in the current frame need subdivision, includes:

parsing the bitstream to obtain an identifier of the division manner, an identifier of the division direction, and the identifier indicating whether the image subblocks need subdivision; or parsing the bitstream and searching a corresponding combination list for an index value according to the division manner, the division direction, and whether the image subblocks need subdivision, and searching, according to the index value, for corresponding information on the division manner, division direction, and whether the image subblocks need subdivision; or parsing the bitstream to obtain an identifier indicating whether the image subblocks need subdivision and obtain an index value in a combination list corresponding to the division manner and the division direction, and obtaining information on the division manner and the division direction according to the index value.

Step 502: Divide the decoding object in the current frame according to the division manner and the division direction, to obtain image subblocks sequentially arranged horizontally or vertically.

If the division manner is non-square division and the division direction is horizontal division, the decoding object in the current frame is divided into multiple image subblocks of the same shape arranged vertically; if the division manner is non-square division and the division direction is vertical division, the decoding object in the current frame is divided into multiple image subblocks of the same shape arranged horizontally.

Step 503: Determine whether to subdivide the image subblocks according to the identifier indicating whether the image subblocks of the decoding object in the current frame need subdivision in the bitstream.

Step 504: Decode the image subblocks according to the residual data if the identifier indicating whether the image subblocks of the decoding object in the current frame need subdivision indicates that the image subblocks need no subdivision, or if the image subblocks are not further divisible into image subblocks of a preset size; otherwise, subdivide the image subblocks according to another predefined size. As shown in FIG. 3, a 4×16 image block is subdivided into four 1×16 smaller blocks.

Figure 6:
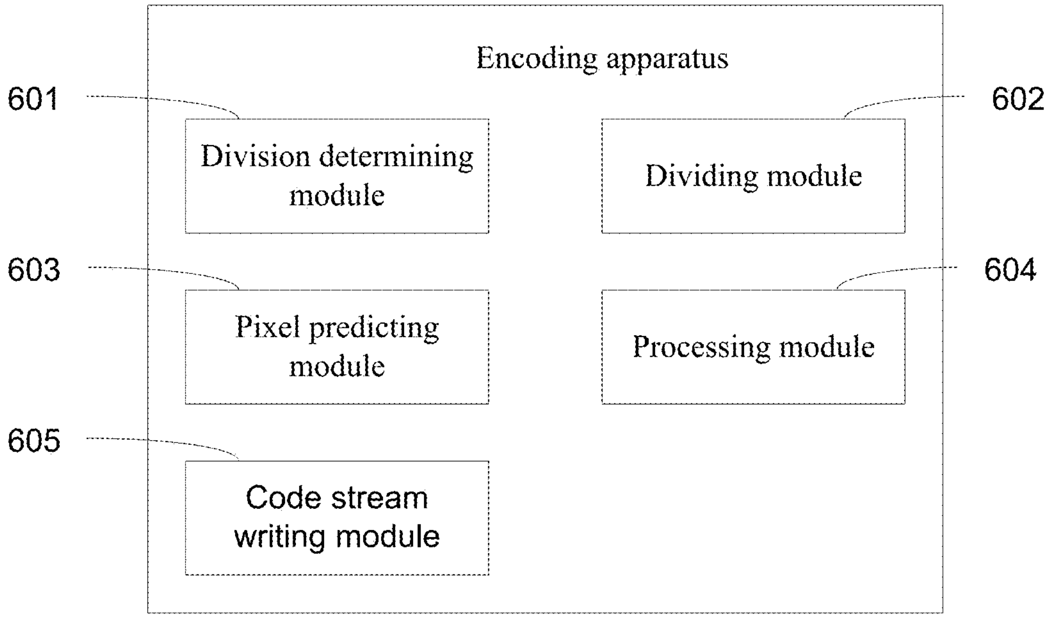
FIG. 6 is a schematic diagram of an encoding apparatus according to an embodiment of the present disclosure.

Further, correspondingly, the present disclosure provides an encoding apparatus that applies the encoding method of the present disclosure. Referring to FIG. 6, FIG. 6 is a schematic diagram of an encoding apparatus according to an embodiment of the present disclosure. The encoding apparatus provided in the embodiment of the present disclosure includes:

- a division determining module 601, configured to: divide an encoding object in a current frame by traversal and perform prediction encoding respectively; and among prediction encoding results, select the following information corresponding to a division process with a minimal code rate distortion cost: a division manner, a division direction, and whether image subblock needs subdivision, where the division manner includes square division and non-square division, and the division direction includes horizontal division and vertical division;
- a dividing module 602, configured to: if the division manner is non-square division, according to the division direction, divide the encoding object in the current frame into image subblocks sequentially arranged horizontally or vertically; if the division direction is horizontal division, divide the encoding object in the current frame into multiple image subblocks of the same shape arranged vertically; if the division direction is vertical division, divide the encoding object in the current frame into multiple image subblocks of the same shape arranged horizontally;
- a pixel predicting module 603, configured to: determine whether the image subblocks need subdivision, and if determining that the image subblocks need no subdivision, predict the encoding object in the frame according to the image subblocks, to obtain residual data; otherwise, subdivide the image subblocks according to another predefined size, and for example, as shown in FIG. 3, a 4×16 image block is subdivided into four 1×16 smaller blocks; and
- a processing module 604, configured to perform transformation, quantization, and entropy encoding for the residual data so as to obtain coded residual data; and
- a bitstream writing module 605, configured to: write into a bitstream the division manner, the division direction, an identifier indicating whether the image subblocks need subdivision, and the coded residual data; or, when the image subblocks are not further divisible into image subblocks of a preset size, write an identifier of the division manner, an identifier of the division direction, and the coded residual data into a bitstream.

Certainly, to facilitate decoding, the pixel predicting module 603 is further configured to obtain a prediction direction of the prediction for the image subblocks. Correspondingly, the bitstream writing module 605 is further configured to write the prediction direction into the bitstream.

Figure 7:
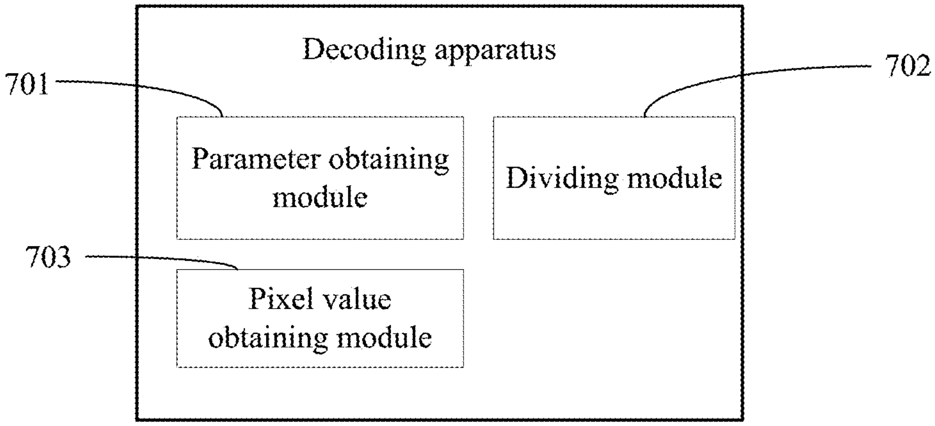
FIG. 7 is a schematic diagram of a decoding apparatus according to an embodiment of the present disclosure.

Further, an embodiment of the present disclosure provides a corresponding decoding apparatus. Referring to FIG. 7, the decoding apparatus according to the embodiment of the present disclosure includes:

- a parameter obtaining module 701, configured to parse a bitstream to obtain a division manner and a division direction of a decoding object in a current frame, an identifier indicating whether image subblocks of the decoding object in the current frame need subdivision, and residual data of the decoding object in the current frame, where the division manner includes square division and non-square division, and the division direction includes vertical division and horizontal division;
- a dividing module 702, configured to divide the decoding object in the current frame according to the division manner and the division direction, to obtain image subblocks sequentially arranged horizontally or vertically; and determine whether to subdivide the image subblocks according to the identifier indicating whether the image subblocks of the decoding object in the current frame need subdivision in the bitstream, where
- if the division manner is non-square division and the division direction is horizontal division, the decoding object in the current frame is divided into multiple image subblocks of the same shape arranged vertically; if the division manner is non-square division and the division direction is vertical division, the decoding object in the current frame is divided into multiple image subblocks of the same shape arranged horizontally; and
- a pixel value obtaining module 703, configured to: decode the image subblocks according to the residual data if the identifier indicating whether the image subblocks of the decoding object in the current frame need subdivision indicates that the image subblocks need no subdivision, or if the image subblocks are not further divisible into image subblocks of a preset size; otherwise, subdivide the image subblocks according to another predefined size. As shown in FIG. 3, a 4×16 image block is subdivided into four 1×16 smaller blocks.

Certainly, in the embodiment of the present disclosure, the parameter obtaining module 701 is further configured to obtain a prediction direction of the image subblocks from the bitstream. The pixel value obtaining module 703 decodes the image subblocks according to the prediction direction and the coded residual data.

Figure 8:
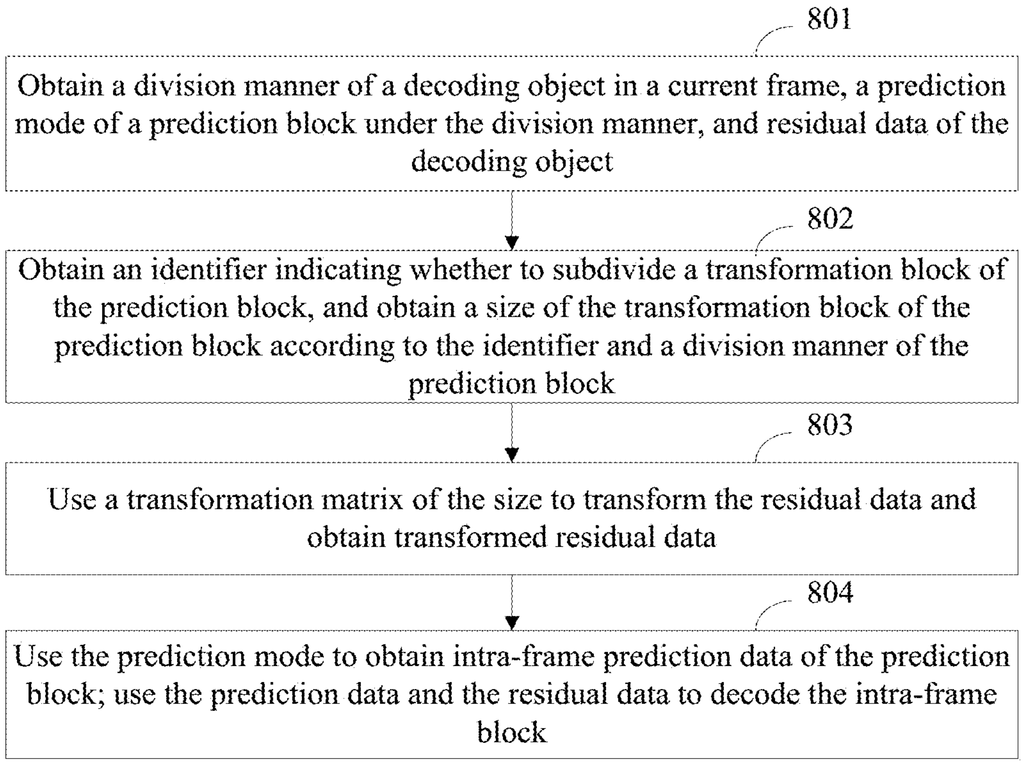
FIG. 8 is a schematic diagram of a decoding method with multiple image block division manners according to another embodiment of the present disclosure.

Further, an embodiment of the present disclosure provides another decoding method. As shown in FIG. 8, the decoding method includes the following steps:

Step 801: Obtain a division manner of a decoding object in a current frame, a prediction mode of a prediction block under the division manner, and residual data of the decoding object.

The division manner includes square division and non-square division, and the division direction includes vertical division and horizontal division. In the embodiment of the present disclosure, the square division refers to dividing the decoding object in the current frame into four square image subblocks of the same size. The non-square division refers to dividing the decoding object in the current frame into vertically or horizontally arranged image subblocks of the same shape. Evidently, in the embodiment of the present disclosure, rectangular image subblocks are preferred. Nevertheless, persons skilled in the art may consider dividing the decoding object in the current frame into image subblocks of other shapes that may be “sequentially arranged”. If the division direction is horizontal division, the encoding object in the current frame is divided into image subblocks of the same shape arranged vertically; if the division direction is vertical division, the encoding object in the current frame is divided into image subblocks of the same shape arranged horizontally.

Step 802: Obtain an identifier indicating whether to subdivide a transformation block of the prediction block, and obtain a size of the transformation block of the prediction block according to the identifier and a division manner of the prediction block.

If the transformation division identifier indicates that the transformation block needs subdivision and the prediction block employs square division, multiple square transformation matrixes smaller than the divided prediction block are obtained. For example, once division is performed, new transformation blocks are obtained, and their size is half of the size of the undivided transformation block.

If the transformation division identifier indicates that the transformation block needs subdivision and the prediction block employs non-square division, multiple non-square transformation matrixes smaller than the divided prediction block are obtained. For example, if the prediction block is divided into horizontally arranged image subblocks of the same size, multiple non-square transformation blocks smaller than the divided prediction block are obtained, with width smaller than height; if the prediction block is divided into vertically arranged image subblocks of the same size, multiple non-square transformation blocks smaller than the divided prediction block are obtained, with width greater than height. According to the preset division manner, the transformation block may be divided into blocks, with width being smaller than the width of the undivided transformation block, and height unchanged; or, with unchanged width and smaller height; or with smaller width and smaller height.

Figure 9:
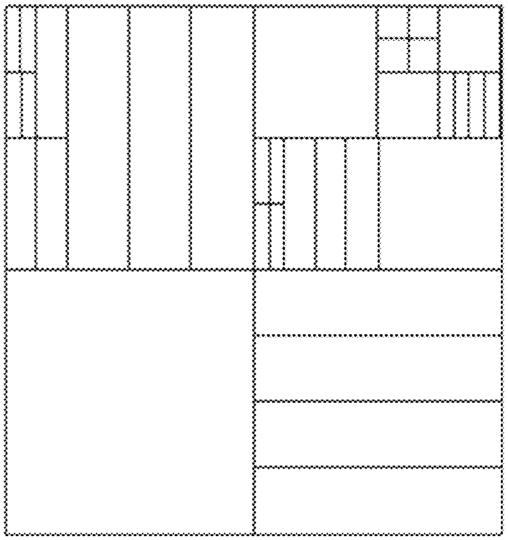
FIG. 9 and FIG. 10 are other schematic diagrams of non-square division.

The divided transformation blocks may be arranged in the following manner: The non-square transformation blocks are sequentially arranged horizontally or vertically in the prediction block of the division manner, as shown in FIG. 3, or are arranged zigzag in the prediction block of the division manner, as shown by the non-square subblocks inside the non-square image block, which are arranged zigzag in FIG. 8 or FIG. 9, where the subblocks may be transformation blocks or prediction blocks.

If the transformation division identifier indicates that the transformation block needs no subdivision, the size of the transformation block of the prediction block is obtained according to division hierarchy of the transformation and the division manner of the prediction block. The final size of the transformation block is obtained after the blocks are divided several times according to preset rules of dividing the transformation block.

When no transformation division identifier exists, the transforming unit does not need to perform further division, and the transformation blocks of the same size as the prediction block or the image subblock are applied; if the prediction block is a square block, square transformation blocks of the same size are obtained; if the prediction block is a non-square block, non-square transformation blocks of the same size as the prediction block are obtained.

Optionally, if the decoding object is divided into non-square prediction blocks whose width is unequal to height, the transformation division identifier may indicate by default that the transformation block needs no more division, the size of the transformation block of the prediction block is the size of the prediction block under the division manner, and the transformation division identifier does not necessarily exist in the bitstream.

Step 803: Use a transformation matrix of the size to transform the residual data and obtain transformed residual data. The detailed transformation process is covered in the prior art, and is not detailed herein any further.

Step 804: Use the prediction mode to obtain intra-frame prediction data of the prediction block; use the prediction data and the residual data to decode the intra-frame block; according to the size of the transformation block and the prediction mode, obtain a prediction block composed of predicted pixel values of the size in the prediction block, and perform a reconstructive decoding operation for the prediction data in the prediction block and the transformed residual data.

Figure 10:
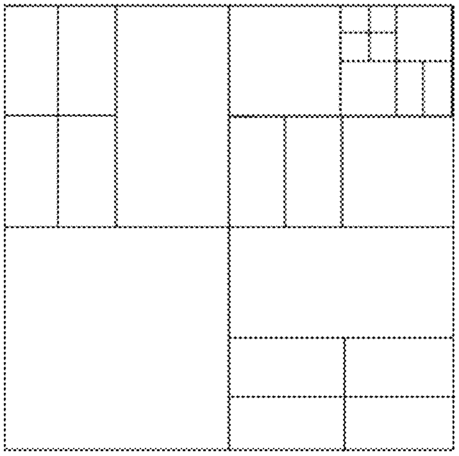

In the embodiment, the encoding object in the frame is divided into image subblocks sequentially arranged horizontally or vertically; when the image subblocks need subdivision, the image subblocks may be subdivided in different manners. When the image subblocks need subdivision, the image subblocks may not only be divided into multiple rectangular blocks sequentially arranged horizontally or vertically, as shown in FIG. 3, but also be divided in other manners shown in FIG. 9 and FIG. 10. The image subblocks may be divided into multiple square blocks according to predefined sizes, or divided into multiple rectangular blocks whose width is unequal to height or length; when the width is greater than the height, the division manner of the image subblocks is a horizontal division manner; when the width is less than the height, the division manner of the image subblocks is a vertical division manner.

According to the description of the foregoing embodiments, persons skilled in the art may clearly understand that the present disclosure may be implemented by software plus a necessary universal hardware platform or by hardware only. In most circumstances, the former is preferred. Based on such an understanding, the technical solutions in the present disclosure essentially, or the part contributing to the prior art may be implemented in the form of a software product. The computer software product is stored in a storage medium, such as a ROM/RAM, a magnetic disk, and an optical disk, and includes several instructions for instructing a computer device (which may be a personal computer, a server, or a network device) to perform all or a part of steps of the methods described in the embodiments of the present disclosure.

The foregoing descriptions are merely exemplary embodiments of the present disclosure. It should be noted that various improvements and modifications made by persons of ordinary skill in the art without departing from the principle of the present disclosure shall fall within the protection scope of the present disclosure.

What is claimed is:

1. A decoding method, comprising:

receiving a bitstream;

parsing the bitstream to determine that a current image block is required to be partitioned;

in response to determining that the current image block is required to be partitioned, parsing the bitstream to determine a partition direction, wherein the partition direction is a horizontal direction;

partitioning the current image block into four rectangular subblocks when the partition direction is the horizontal direction, wherein a size of the current image block is expressed as 4×16, and a size of each of the four rectangular subblocks is expressed as 1×16; and reconstructing the current image block based on the four rectangular subblocks.

2. An encoding method, comprising:

determining that a current image block is required to be partitioned;

in response to determining that the current image block is required to be partitioned, determining that the current image block is required to be partitioned in a horizontal direction;

in response to the current image block being required to be partitioned in the horizontal direction, partitioning the current image block into four rectangular subblocks, wherein a size of the current image block is expressed as 4×16, and a size of each of the four rectangular subblocks is expressed as 1×16; and writing information into a bitstream, wherein the information specifies whether the current image block is required to be partitioned and whether the current image block is required to be partitioned in the horizontal direction or the vertical direction.

3. A non-transitory computer-readable storage medium storing a bitstream and one or more instructions executable by at least one processor to perform operations of encoding of the bitstream, the operations comprising:

determining that a current image block is required to be partitioned;

in response to determining that the current image block is required to be partitioned, determining that the current image block is required to be partitioned in a horizontal direction;

in response to the current image block being required to be partitioned in the horizontal direction, partitioning the current image block into four rectangular subblocks, wherein a size of the current image block is expressed as 4×16, and a size of each of the four rectangular subblocks is expressed as 1×16; and writing information into a bitstream. wherein the information specifies whether the current image block is required to be partitioned and whether the current image block is required to be partitioned in the horizontal direction or the vertical direction.

* * * * *